United States Patent Office 3,361,733
Patented Jan. 2, 1968

3,361,733
POLYMERIZATION OF N-DITHIOCARBON-YLETHOXYCARBONYL DERIVATIVES OF AMINO ACIDS
Seizo Okamura, Toshinobu Higashimura, and Hideo Kato, Kyoto, Japan, assignors to Osaka Printing Ink Manufacturing Company, Limited, Osaka, Japan, a corporation of Japan
No Drawing. Filed Nov. 6, 1964, Ser. No. 409,556
1 Claim. (Cl. 260—112.5)

This invention relates to a new method of synthesizing polypeptides and the providing of catalysts, therefore and more specifically, this invention relates to the method of synthesizing polypeptides of a high molecular weight by heating or subjecting to condensation-polymerization N-dithiocarbonylalkoxycarbonyl-amino acids (hereafter abbreviated as DTA amino acids) with a catalyst in solution or as a solid, and to the method of synthesizing polypeptides directly in water by reacting basic carbon disulfide and alkyl halogen formates with amino acids and without isolating the DTA-amino acids.

Conventionally, the use of carboxy-α-amino acid anhydrides is most widely known in the synthesis of polypeptides. This method, however, is limited to α-amino acids only, making impossible the polymerization of ω-amino acid oligopeptides as units or co-polymerization of α-amino acids and ω-amino acids or oligopeptides. Besides, since the monomer is unstable, its handling was extremely difficult.

For removing these defects, a number of comprehensive peptide synthesizing methods are known. These comprehensive synthesizing methods, while they make it possible to carry out polymerization of ω-amino acids and oligopeptides, with a low degree of polymerization, and, besides, they require employment of a catalyst in a large quantity. Moreover, they make it necessary to carry out polymerization at a high temperature and for a long period of time (several score to several hundred hours).

The present inventors, as a result of intensive research conducted with the aim of finding a method of synthesizing polypeptides of a high molecular weight in a relatively short period of time, and, besides, which may be equally applied to α-amino acids and ω-amino acids, have achieved the result by the use of DTA-amino acids.

DTA-amino acids, as shown by the following general formula, may be synthesized from α-amino acids, ω-amino acids and, also, from oligopeptides. For instance, when R is ethyl radical with N-dithiocarbonylethoxycarbonyl-amino acid, glycine (M.P. 127–129° C.), DL-α-alanine (M.P. 123–125° C.), L-α-alanine (M.P. 91–93° C.), DL-α-valine (M.P. 93–95° C.), DL-methionine (M.P. 81–83° C.), L-leucine (M.P. 78–80° C.), β-alanine (M.P. 111–113° C.), ε-amino-η-butyric acid (M.P. 89–91° C.), ε-amino-η-caproic acid (M.P. 67–69° C.), glycylglycine (M.P. 129–131° C.), and other similar N-dithiocarbonyl-ethoxycarbonyl-amino acids may be senthesized.

Here follows the general formula for DT-amino acid:

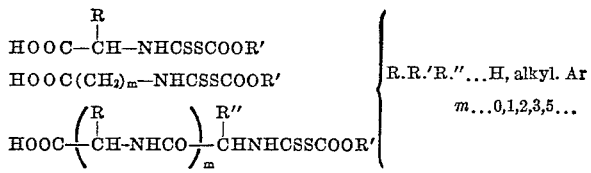

R.R.'R."...H, alkyl. Ar
m...0,1,2,3,5...

Because synthesis is achieved in water by using such common reagents as DTA-amino acids, carbon disulfide, caustic alkali, etc., handling is extremely easy and simple, and besides, a high economization may be obtained.

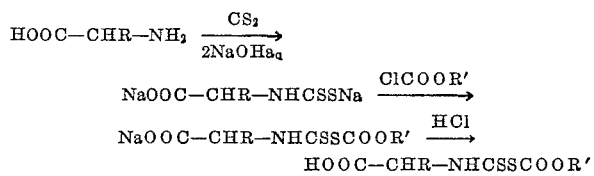

$$HOOC-CHR-NHCSSCOOR'$$

This DTA-amino acid is highly active, and, accordingly, by simply heating it as a solid or in solution, polypeptides of a high molecular weight may be obtained in a short period of time and with a high rate of yield, for example:

$$HOOC-CHR-NHCSSCOOR' \rightarrow (OC-CHR-NH)_n + 2COS + R'OH$$

Generally, polymerization is stimulated by the presence of basic substances while it is inhibited by the presence of acidic substances. Basic substances, or organic amines, caustic alkalis or carbonic alkalis, such as aniline, pyridine or triethylamine, stimulate polymerization, and, thus, are effective as catalysts. On the other hand, also in the presence of acidic substances (e.g. benzoic acid), polymerization is possible, and, if they are used in large quantities, the speed of polymerization may be inhibited, but, in case they are used in small quantities (below $\frac{1}{100}$ mol as against the monomer) they provide no major effect on the polymerizing speed. For this reason, acidic substances may be used for the adjustment of the time and degree of polymerization.

Such basic catalysts as pyridine or aniline, mentioned above, are highly effective in accelerating the polymerizing speed. However, if they are used in very large quantities, they work to reduce the degree of polymerization while the product of polymerization is apt to be colored.

On the other hand, amino acids, as do basic substances, have the capacity to accelerate polymerization. Especially in the case of amino acids, which dissolve in the polymerizing medium (e.g. p-aminobenzoic acid), this accelerating capacity is outstanding. Here, unlike the case of aniline or pyridine, the polymer formed is never colored. Thus, they are known to be highly efficient as catalysts.

Polypeptides, like amino acids, never color the product and, besides, accelerate the polymerizing speed, and, thus, are highly effective as catalysts, Poly-L-phenylalanine, e.g., is known to be outstanding in this action.

In polymerization in water, a partial hydrolysis takes place and, as a result, amino acids are recovered. Thus, the rate of yield drops, but, if a small volume of water is added to the polymerization medium, practically no hydrolysis takes place, polymerization being remarkably accelerated. In this case, too, the product is never colored, as in the case of amino acids and polypeptides, and, moreover, the degree of polymerization is not reduced to a major extent. Thus, it is known to be effective as a catalyst.

DTA amino acids, as described above, may be isolated by cooling alkyl haloformates in dithiocarbonic acid salts and by causing the former to react with the latter, and, by immediately acidifying it. If, after the addition of alkyl haloformates, it is caused to react for a long time, while remaining alkali, polypeptides may be obtained directly as follows:

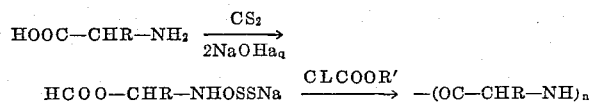

This method, as compared with the foregoing DTA amino acid method, while it gives polypeptides with a lower degree of polymerization, has the advantages that polypeptides may be obtained directly from amino acids and that water may be used as the polymerizing medium, and, thus, the synthesizing process can be highly economical.

EMBODIMENTS (1) N - dithiocarbonylethoxycarbonyl - DL - α - alanine (2.37 g.) is dissolved in dioxane (25 cc.), and poly-L-phenylalanine ($\eta_{sp./c.}=0.094$) (0.03 g.) is added, and polymerization is carried out for 60 minutes at 80° C. After reaction, it is filtered, washed with acetone and dried.

Yield: 0.622 g. (88%). Viscosity: $\eta_{sp./c.}=0.22$ (dichloroacetic acid solution, 0.4 g./100 cc.) 30° C.

(2) N - dithiocarbonylethoxycarbonyl - DL - α - alanine (2.37 g.) is dissolved in dioxane (25 cc.). P-aminobenzoic acid (0.007 g.) is added, and polymerization is carried out for 120 minutes at 80° C. After reaction, the same treatment as in Embodiment (1) is given.

Yield: 0.631 g. (89%), Viscosity: $\eta_{sp./c.}=0.29$ with dichloroacetic acid solution (0.4 g./100 cc.), 30° C.

(3) N - dithiocarbonylethoxycarbonyl - DL - α - alanine (2.37 g.) is dissolved in dioxane (25 cc.). Benzoic acid (0.012 g.) is added and polymerization is carried out for 240 minutes at 80° C.

Yield: 0.551 g. (78%). Viscosity: $\eta_{sp./c.}=0.34$ with dichloroacetic acid (0.4 g./100 cc.), 30° C.

(4) N - dithiocarbonylethoxycarbonyl - DL - α - alanine (2.67 g.) is dissolved in dioxane (30 cc.). Water (0.1 cc.) is added and polymerization is carried out for 250 minutes at 80° C.

Yield: 0.678 g. (85%). Viscosity: $\eta_{sp./c.}=0.30$ with dichloroacetic acid (0.5 g./100 cc.) 30° C.

(5) N - dithiocarbonylethoxycarbonyl - DL - α - alanine (2.37 g.) is disolved in dioxane (25 cc.). Aniline (0.0042 g.) is added, and polymerization is carried out for 180 minutes at 80° C.

Yield: 0.71 g. (100%). Viscosity: $\eta_{sp./c.}=0.16$ with dichloroacetic acid (0.4 g./100 cc.) 30° C.

(6) N - dithiocarbonylethoxycarbonyl - DL - α - alanine (2.37 g.) is dissolved in dioxane (25 cc.) and polymerization is caried out for 300 minutes at 80° C.

Yield: 0.542 g. (76%). Viscosity: $\eta_{sp./c.}=0.37$ with dichloroacetic acid (0.4 g./100 cc.), 30° C.

(7) N - dithiocarbonylethoxycarbonyl - α - alanine (2.37 g.) is dissolved in nitrobenzene (25 cc.) and polymerization is carried out for 240 minutes at 130° C.

Yield: 0.534 g. (75%). Viscosity: $\eta_{sp./c.}=0.24$ with dichloroacetic acid (0.4 g./100 cc.), 30° C.

(8) N - dithiocarbonylethoxycarbonyl-glycine (4.46 g.) is suspended in water (50 cc.) NaOH (0.4 g.) is added and polmerization is carried out for 60 minutes at 60° C. After completion of reaction, it is neutralized by using HCl, filtered, washed with water and acetone and dried.

Yield: 0.479 g. (42%). Viscosity: $\eta_{sp./c.}=0.15$ with dichloroacetic acid (0.4 g./100 cc.), 30° C.

(9) N - dithiocarbonylethoxycarbonyl - DL - α - alanine crystal (2.37 g.) is heated for two days at 60° C. After completion of reaction, it is washed with acetone and dried.

Yield: 0.71 g. (100%). Viscosity: $\eta_{sp./c.}=0.12$ with dichloroacetic acid (0.4 g./100 cc.), 30° C.

(10) To an aqueous alkali solution of L-leucine (L-leucine (23.3 g.), NaOH (16.8 g.), H₂O (300 cc.)), carbondisulfide (15.2 g.) is added, and is made to react for 2 hours below 150° C. and for 6 hours at 25–30° C. As the reaction solution becomes transparent ethyl chloroformate (21.15 g. is added and the reaction is allowed to continue for 2 hours, when poly-L-leucine is precipitated. After filtering, it is washed by HCl aq. and H₂O and is dried. This, then, is extracted and refined by using with a soxhlet extractor.

Yield: 9.5 g. (42%). Viscosity: $\eta_{sp./c.}=0.093$ with dichloroacetic acid (0.4 g./100 cc.).

What is claimed is:

1. A method of synthesizing high molecular weight polypeptides consisting of heating for 1 to 5 hours at a temperature of 60 to 150° C. a N-dithiocarbonylethoxycarbonyl derivatives of an amino acid from the group consisting of glycine, alanine, valine, methionine, leucine, B-alanine, ε-amino-η-butyric acid, ε-amino-η-caproic acid and phenylalanine in a solvent from the group consisting of water, dioxane and nitrobenzene in the presence of about 0.01 mole percent of a catalyst from the group consisting of analine, sodium hydroxide, polyphenylalanine and p-aminobenzoic acid, based upon the amount of monomer employed.

References Cited

UNITED STATES PATENTS 2,796,376  6/1957  Williams et al. _____ 167—22
3,070,491  12/1962  Heusch _____ 167—22

FOREIGN PATENTS 15,840  7/1965  Japan.

OTHER REFERENCES

Cook et al.: J. Chem. Soc. 1948, 1056–1060.
Dalgleish: J. Chem. Soc. 1949, 1797–1799.
Okamura et al.: Makromol. Chem. 90, 254–261 (1966).

ELBERT L. ROBERTS, *Primary Examiner.*

M. M. KASSENOFF, *Assistant Examiner.*